United States Patent
Orehawa

(10) Patent No.: US 10,146,717 B2
(45) Date of Patent: Dec. 4, 2018

(54) SERVO DRIVE DEVICE

(71) Applicant: Control Techniques Limited, Newtown (GB)

(72) Inventor: Luke Duane Orehawa, Newtown (GB)

(73) Assignee: NIDEC CONTROL TECHNIQUES LIMITED, Newtown (GB)

( * ) Notice: Subject to any disclaimer, the term of this patent is extended or adjusted under 35 U.S.C. 154(b) by 194 days.

(21) Appl. No.: 14/605,559

(22) Filed: Jan. 26, 2015

(65) Prior Publication Data

US 2015/0212962 A1   Jul. 30, 2015

(30) Foreign Application Priority Data

Jan. 27, 2014 (GB) .................. 1401343.7

(51) Int. Cl.
| | |
|---|---|
| *G06F 13/40* | (2006.01) |
| *G06F 13/38* | (2006.01) |
| *G05B 19/042* | (2006.01) |
| *G05B 19/414* | (2006.01) |

(52) U.S. Cl.
CPC ..... *G06F 13/4022* (2013.01); *G05B 19/0423* (2013.01); *G06F 13/387* (2013.01); *G06F 13/4027* (2013.01); *G06F 13/4068* (2013.01); *G05B 19/414* (2013.01)

(58) Field of Classification Search
CPC . G05B 19/0423; G05B 19/0428; H04L 69/08; H04L 69/18; G06F 13/387
See application file for complete search history.

(56) References Cited

U.S. PATENT DOCUMENTS

| | | | | |
|---|---|---|---|---|
| 5,293,488 | A  | * | 3/1994 | Riley .............. H04L 29/00 709/243 |
| 7,266,281 | B1 | * | 9/2007 | Flatau .............. G02B 6/4452 385/135 |
| 7,646,981 | B2 |   | 1/2010 | Coffey |
| 7,719,961 | B2 |   | 5/2010 | Sichner |
| 7,880,734 | B2 |   | 2/2011 | Khanchin |
| 8,046,444 | B2 | * | 10/2011 | Klug .............. G05B 19/0423 709/222 |
| 8,055,814 | B2 |   | 11/2011 | Sichner et al. |
| 8,203,980 | B2 |   | 6/2012 | Sichner et al. |

(Continued)

FOREIGN PATENT DOCUMENTS

EP     2071862     6/2009

OTHER PUBLICATIONS

Emerson Industrial Automation—Control Techniques: "Digitax ST—Servo drives range that Is Intelligent, compact and dynamic"; 16 pages, Dated 2016.*

*Primary Examiner* — Brian T Misiura

(74) *Attorney, Agent, or Firm* — Harness, Dickey & Pierce, P.L.C.

(57) ABSTRACT

A device is provided in which messages are received from a backplane through backplane connectors. Switching circuitry identifies which messages received from the backplane are intended for the operational circuitry of the device and interprets the input/output protocol of such messages while returning messages not intended for the operational circuitry to the backplane. The switching circuitry is removable from the device independently of the backplane connectors, allowing it to be changed for use with different backplane protocols without affecting other device elements.

13 Claims, 2 Drawing Sheets

(56) References Cited

U.S. PATENT DOCUMENTS

| | | | |
|---|---|---|---|
| 9,288,112 B2* | 3/2016 | Riederer | ................. H04L 41/12 |
| 2007/0186010 A1 | 8/2007 | Hall et al. | |
| 2010/0235614 A1 | 9/2010 | Callaghan et al. | |
| 2014/0369179 A1* | 12/2014 | Ueda | ....................... H04L 45/00 |
| | | | 370/217 |

* cited by examiner

SERVO DRIVE DEVICE

CROSS-REFERENCE TO RELATED APPLICATION

This application claims the benefit and priority of Great Britain Patent Application No. 1401343.7 filed Jan. 27, 2014. The entire disclosure of the above application is incorporated herein by reference.

FIELD

The present disclosure relates to a device connected to a backplane for communication via an input/output protocol, and a system comprising a plurality of such devices. In particular, but not exclusively, the present disclosure relates to servo drive devices connected via a backplane.

BACKGROUND

This section provides background information related to the present disclosure which is not necessarily prior art.

Industrial control devices or controllers are used to control industrial operations. For example, servo drives can be used to control industrial machinery by providing appropriate drive signals to that machinery. Industrial controllers of this type must themselves be managed and controlled in order to provide the desired performance. This means controllers must have input/output (I/O) functionality.

Often, industrial controllers are used in concert, with specialised devices used for specific tasks. As an illustrative example, one may consider a 3D system in which there is a desire to control an element to take a position in 3D space. This requires control in all three dimensions. One approach would involve separate controllers for each of the three dimensions working together. The controllers in such a system must communicate with one another effectively in order to produce the desired result.

Typically, a backplane is provided to allow controllers within a system to communicate. A backplane provides a communications interface through which signals may be passed between controllers connected to the backplane. The backplane operates a given input/output (I/O) protocol which the controllers are designed to operate with through their own I/O componentry.

The I/O protocols operated by backplanes are often proprietary and designed by the supplier of the industrial controllers. This means there is a lack of interoperability between controllers provided by different manufacturers. Accordingly when it is desired to upgrade or repair a system comprising a plurality of controllers by adding or replacing a controller, any new controller must be adapted to work with the appropriate I/O protocol used by the backplane. Even if the protocol is not itself proprietary, there remains a requirement that all controllers operate the same I/O protocol and are able to physically interface with the backplane.

As a result of these issues, a given controller will only operate with compatible backplanes. Accordingly, an operator who wishes to obtain an appropriate controller has a choice limited to those that are compatible with the current systems, which can lead to sub-optimal choices.

The increasing complexity of control tasks has led to an increasing to desire to communicate with controllers through computer sources outside of the backplane. For example, it may be commercially desirable to effect control or monitor performance from a conventional computer or another part of a business system. However, the typical communications protocols used by business systems are again different to that used by industrial controllers. Often, business systems will communicate using Ethernet based protocols, for example. There has thus been a need for a bridging device or devices to communicate between the different protocols in use. This leads to further expense and potential issues of reliability.

An example of an approach to bridging between an Ethernet network and a protocol for use with industrial controllers is described in U.S. Pat. No. 8,203,980. Here a bridging system is disclosed in which a number of components connected to a backplane may be linked to an Ethernet general purpose network through a single node on the general purpose network. The purpose is to avoid each individual component on the backplane having to interface with the general purpose network directly. However, the components of the backplane are still obliged to communicate with each other using the appropriate protocol for the backplane itself.

In recent times, efforts have been made to develop an appropriate protocol for controller communication based on Ethernet. One example is the EtherCAT (Ethernet for Control Automation Technology) protocol, which is a high performance Ethernet-based protocol designed to offer short data update times and low communication jitter. This allows a more ready integration of the controllers and backplane with an Ethernet-based general purpose network.

There remain a range of communication protocols for backplanes used with industrial controllers and similar devices. While protocols based on Ethernet provide some standardisation, in the absence of an accepted universal standard, devices of this type continue to require specific componentry for each protocol with which they want to operate. This leads to a lack of customer choice, as they may for example be limited to devices which are interoperable with legacy systems.

SUMMARY

This section provides a general summary of the disclosure, and is not a comprehensive disclosure of its full scope of all of its features.

According to an aspect of the disclosure, there is provided a device for communicating via an input/output protocol, the device comprising:

one or more backplane connectors for connecting the device to a backplane;

operational circuitry for performing a processing task of the device;

a switching circuit configured to identify which messages received through the connectors are relevant to the operational circuitry, interpret the input/output protocol of messages identified as relevant and return other messages to the backplane through the connectors, wherein the switching circuit is mounted to the device removably and independently of the backplane connectors.

This aspect of the disclosure provides a device in which a switching circuit acts to interpret the I/O protocol of messages relevant to the operational circuitry of the device which are provided through a backplane. The switching circuit is removable from the device independently of backplane connectors that connect the device to the backplane. Accordingly, different switching circuits appropriate to different protocols can be used with the device. This does not require the connectors to be replaced at the same time. Instead, it has been recognised that the same connectors may be used for multiple different protocols, enabling a modular system to be created in which the minimum expense is incurred when changing protocol.

The backplane may be a physical component, such as a circuit board, or may be a logical construct. For example, devices may be coupled directly to each other, with the backplane representing the path for communications signals between devices.

Preferably, the backplane connectors are fixedly mounted to the device. This can help to further improve the reliability of the connectors, since they are not removed or replaced.

In preferred embodiments, the input/output protocol is a layered protocol. More preferably, the input/output protocol is an Ethernet protocol, preferably an EtherCat protocol. Protocols of this kind are particularly suited to the present disclosure as many variations may use substantially similar physical connections. Moreover, layered protocols such as Ethernet are well established and common in the art, and a protocol based on similar principles can enable relatively easy interoperability with external elements.

Preferably, the device comprises at least two connectors disposed on opposite faces of the device. By providing connectors on each side of the device, multiple devices can be stacked or disposed in a linear array, with connections to each other through the connectors on each side. Thus, a backplane can be formed from multiple devices without the requirement for a separate backplane board or similar. Instead, the backplane is distributed amongst the array of devices.

In preferred embodiments, a connector on a first face of the device is a male connector, while a connector on a second, opposing, face is a complimentary female connector. This assists in the secure connection of the devices in an array Preferably, the device further comprises an external connector for communicating messages out of the backplane. The external connector can be an Ethernet connector, for example, and may be configured as an RJ45 socket. This can enable the external connector to readily communicate with external Ethernet device or components.

The external connector may be removably mounted to the device. This can enable, for example, replaceable external connectors to be provided according to the requirements of an external communications network. The external connector and the switching circuitry may be mounted to a common replaceable element.

In preferred embodiments, the operational circuitry is control circuitry. Preferably, the operational circuitry is drive circuitry, more preferably servo drive circuitry.

According to a further aspect of the present disclosure, there is provided a system comprising a plurality of devices according to any one of the preceding claims connected via a backplane. For example, the devices of the system may be directly coupled to one another through the backplane connectors of each device.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1A a drive device according to a preferred embodiment of the present disclosure;

Corresponding reference numerals indicate corresponding parts throughout the several views of the drawings.

DETAILED DESCRIPTION

Example embodiments will now be described more fully with reference to the accompanying drawings.

Figure 1A:
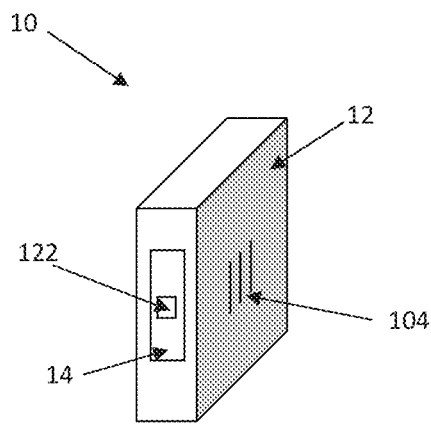
FIG. 1B illustrates a system comprising an array of the devices of FIG. 1A.

Referring to FIG. 1A, a device 10 is provided. The device 10 is a servo drive, although it can be recognised that other devices may be used. For example, alternative drive devices or other control devices may be used.

The device 10 comprises a housing 12 which contains the operational circuitry of the device 10. A first backplane connector 104 is shown disposed on a side face of the housing 12. A second backplane connector 110 (shown in FIG. 2) is disposed on the opposite face of the housing 12. The backplane connectors 104, 110 are mating connectors; for example, the backplane connector 104 on one side of the device 10 may have a male configuration and the backplane connector 110 on the other may have a female configuration. In this manner, the backplane connectors 104, 110 of different devices may be used to couple the devices together.

A removable interface card 14 is provided. The removable interface card 14 comprises the processing capability to interpret messages received through the backplane connector and deliver them to the operational circuitry of the device 10. Different interface cards can be used to operate with different I/O protocols in the backplane.

An external connector 122 is optionally provided. In the preferred embodiment, the external connector 122 forms part of the removable interface card 14. The external connector 122 can be used for communications out of the backplane. In the preferred embodiment, the external connector 122 is a conventional Ethernet connector, such as an RJ45 connector.

Figure 1B:
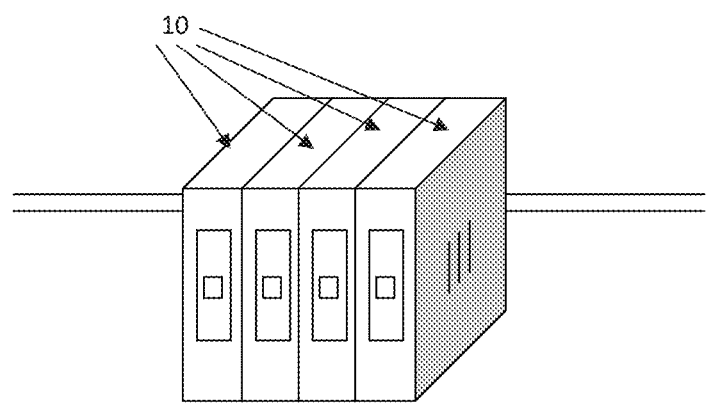

In FIG. 1B a plurality of devices 10 are shown in a linear array. Backplane connectors 104 and 110 of each device are engaged to one another, therefore forming a backplane to enable communication between the devices. The drives may be mounted in a DIN-rail rack, but in the preferred embodiment this is not used for communication between the devices 10.

Figure 2:
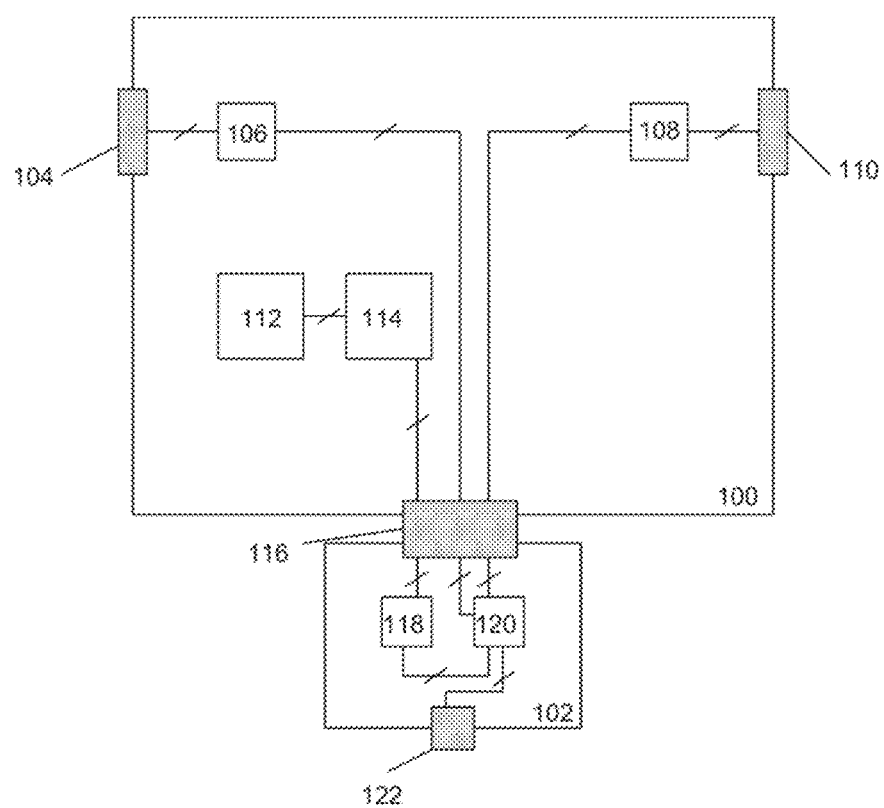
FIG. 2 is a circuit diagram of the device of FIG. 1A.

FIG. 2 shows a schematic representation of a circuit diagram of the device 10 of FIG. 1A. The device 10 comprises a host printed circuit board (PCB) 100 on which operational circuitry comprising a processor 112 and shared memory 114 are disposed. Also mounted to the host PCB 100 are backplane connectors 104 and 110. The processor 112 carries out the functional task assigned to the device 10 using the information available in memory 114. For example, the processor 112 may be designed to drive a servo motor. Although the output drive signal is not illustrated in FIG. 2, the skilled person will recognise that this may take any appropriate form.

An interface 116 is also provided on the host PCB 100. Furthermore, transformers 106, 108 are disposed on the path between the backplane connectors 104, 110 and the interface 116. The transformers 106, 108 are configured to condition signals coming from and going to the backplane via backplane connectors 104, 110 to have suitable properties for handling either by the device 10 or the backplane. For example, the transformers may ensure isolation and noise immunity. The transformers are blind to the particular protocol used by these signals but may control generic signal properties such as voltage level, although in a preferred embodiment 1:1 transformers are used so the voltage remains the same.

A second PCB is also provided. This is the sub-assembly PCB 102. The sub-assembly PCB 102 forms part of the removable interface card 14 and may interface with the host PCB 100 through the interface 116.

The sub-assembly PCB 102 hosts a switching circuit 120 configured to interpret the protocol of messages transmitted through the backplane. In the example of FIG. 2, the switching circuit 120 is an Ethernet processing Integrated Circuit (IC) which can decode and interpret the protocol of signals using an Ethernet protocol. An application specific integrated circuit (ASIC) or field programmable gate array (FPGA) may also be used for this purpose and may be arranged to operate with Ethernet based or other protocols, such as other layered protocols. Examples of protocols the switching circuit 120 may be arranged to operate with include EtherCAT, PROFINET, POWERLINK, standard Ethernet with IEEE1588, although the skilled person will recognise that others may also be used.

The switching circuit may comprise media access controller (MAC) and physical (PHY) layers. However, in some embodiments, components on host PCB 100, such as the transformers 106, 108 may act as the PHY layer, leaving only MAC characteristics to be carried out by switching circuit 120. This takes advantage of the fact that multiple different protocols may have the same physical manifestation while requiring a different MAC.

The sub-assembly PCB 102 also hosts a microprocessor 118 which can be used to control the switching circuit 120. In particular, the switching circuit 120 may interpret the input/output protocol into a form accepted by the memory 114 for exchange with the CPU 112 or other processes within the device 10.

External connector 122 is hosted on the sub-assembly PCB 102. As mentioned previously, the external connector may have a conventional physical format. For example, the external connector may be an RJ45 connector. Signals received or transmitted through the external connector 122 are processed by switching circuit 120.

In use, the device 10 may be arranged within an array of devices 10 such as that shown in FIG. 1B. The device 10 performs a task relevant to the control of an industrial process. As such, it is required to communicate with the item it is controlling and with other devices in the array. Communications signals are transmitted between the devices across a backplane established by the backplane connectors 104, 110 of each device 110. These communications signals have a given input/output protocol allowing information to be conveyed.

When a message is received by the device 10 from the backplane it is first received by one or more of the backplane connectors 104, 110. The message is then passed to transformer, 106, 108 for conditioning. The message is then transmitted through interface 116 to the switching circuit 120.

The switching circuit identifies from the protocol whether the message is intended for the particular device 10. For example, messages may be addressed specifically to that device or may be broadcast to a group of device including the particular device 10. If the message received through the back plane connectors is not for use by the device 10, the switching circuit 120 returns it to the backplane, via transformers 106, 108 and backplane connectors 104, 110. On the other hand, if the message is intended for the device 10, the switching circuit will interpret the protocol of the message. It may then pass relevant information extracted from the message on to the memory 114 in an appropriate format for use by the processor 112 or another processor connected to the memory 114.

Messages produced by the processor 112 which are intended for other devices or external components are also handled by the switching circuit 120. The switching circuit 120 will encode the messages using the appropriate protocol for transmission across the backplane through backplane connectors 104, 110 or external to the backplane through the external connector 122.

The components of the device 10, such as the switching unit 120, which are specific to the protocol used in the backplane are located on the sub-assembly PCB 102 of the interface card. Accordingly, the device 10 can be used with different protocols be replacing the interface card with a card appropriately configured for a different protocol. This does not interfere with the actual physical backplane connectors 104, 110, which remain hosted by the host PCB 100. Accordingly, the reliability and robustness of these backplane connectors 104, 110, which are exposed to external use and thus potential damage is not impaired by a requirement to be removable.

As mentioned above, it is not essential for an external connector 122 to be provided on all devices 10, although in doing so the advantage is obtained that communication with components which are not part of the backplane can be enabled. The transformers 106, 108 are provided on the host PCB 100 in the preferred embodiment described above, but in other embodiments may be provided on the sub-assembly PCB 102.

Other variations and modifications will be apparent to the skilled person. Such variations and modifications may involve equivalent and other features which are already known and which may be used instead of, or in addition to, features described herein. Features that are described in the context of separate embodiments may be provided in combination in a single embodiment. Conversely, features which are described in the context of a single embodiment may also be provided separately or in any suitable sub-combination.

It should be noted that the term "comprising" does not exclude other elements or steps, the term "a" or "an" does not exclude a plurality, a single feature may fulfill the functions of several features recited in the claims and reference signs in the claims shall not be construed as limiting the scope of the claims. It should also be noted that the Figures are not necessarily to scale; emphasis instead generally being placed upon illustrating the principles of the present disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A device for communicating via an input/output protocol, the device comprising:
   one or more backplane connectors for connecting the device to a backplane;

operational circuitry for performing a processing task of the device; and a switching circuit configured to identify messages received through the one or more backplane connectors as relevant if they are addressed to the operational circuitry, interpret an input/output protocol of the messages identified as relevant and return other messages not for use by the device to the backplane through the one or more backplane connectors, wherein the switching circuit is mounted to the device removably and independently of the backplane connectors.

2. A device according to claim 1, wherein the backplane connectors are fixedly mounted to the device.

3. A device according to claim 1, wherein the input/output protocol is a layered protocol.

4. A device according to claim 1, wherein the input/output protocol is an Ethernet protocol.

5. A device according to claim 1, wherein the one or more backplane connectors includes at least two backplane connectors disposed on opposite faces of the device.

6. A device according to claim 5, wherein the at least two backplane connectors comprise male and female connectors for mating connection with one another.

7. A device according to claim 1, further comprising an external connector for communicating messages out of the backplane.

8. A device according to claim 7, wherein the external connector is removably mounted to the device.

9. A device according to claim 1, wherein the operational circuitry is control circuitry.

10. A device according to claim 9, wherein the operational circuitry is drive circuitry.

11. A system comprising a plurality of devices according to claim 1 connected through a backplane.

12. A device according to claim 10, wherein the drive circuitry includes servo drive circuitry.

13. A device according to claim 4, wherein the Ethernet protocol includes an EtherCAT protocol.

* * * * *